(12) United States Patent
Giltner

(10) Patent No.: US 6,428,217 B1
(45) Date of Patent: Aug. 6, 2002

(54) APPARATUS AND METHOD FOR ENCAPSULATION OF AN OPTICAL FIBER SPLICE

(75) Inventor: David M. Giltner, Fremont, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/543,640

(22) Filed: Apr. 6, 2000

Related U.S. Application Data

(60) Provisional application No. 60/128,108, filed on Apr. 7, 1999.

(51) Int. Cl.[7] .............................................. G02B 6/255
(52) U.S. Cl. .............................. 385/95; 385/96; 385/97; 385/98; 385/99; 372/6
(58) Field of Search .............................. 385/95–99, 29, 385/49, 50–52, 58, 69, 77; 372/6

(56) References Cited

U.S. PATENT DOCUMENTS

| | | | | |
|---|---|---|---|---|
| 5,347,606 A | * | 9/1994 | Johansen et al. | 385/99 |
| 5,430,821 A | * | 7/1995 | Sasoka et al. | 385/99 |
| 5,784,514 A | * | 7/1998 | Yanagi et al. | 385/99 |
| 5,999,674 A | * | 12/1999 | Yui et al. | 385/99 |
| 6,336,749 B1 | * | 1/2002 | O'Toole et al. | 385/96 |

* cited by examiner

*Primary Examiner*—Hemang Sanghavi
(74) *Attorney, Agent, or Firm*—Kudirka & Jobse LLP

(57) ABSTRACT

An optical fiber splice apparatus has a covering that surrounds the splice between two optical fibers, and conducts residual pump energy in the fiber claddings away from the splice. This prevents the residual light from reaching components, such as plastic buffers, that are susceptible to failure from excess light absorption. The apparatus may use an optical epoxy covering that surrounds adjoining portions of both fibers, and that has a refractive index higher than that of the outermost fiber claddings. The covering may be surrounded by a glass capillary that is transparent to the residual light, and that conducts light from the covering further away from the splice. The capillary may be mounted in a metal housing by an adhesive epoxy that is transparent to the residual pump light, and can conduct light to an inner surface of the housing, which may be light absorbent to the wavelength range of the residual pump light. The splice apparatus may be part of an overall optical gain device such as a fiber laser or fiber optic amplifier.

36 Claims, 4 Drawing Sheets

APPARATUS AND METHOD FOR ENCAPSULATION OF AN OPTICAL FIBER SPLICE

CROSS-REFERENCE TO RELATED APPLICATIONS

This application takes priority from the provisional application filed in the United States Patent and Trademark Office on Apr. 7, 1999, U.S. Ser. No. 60/128,108, entitled "APPARATUS FOR ENCAPSULATING A SPLICED DOUBLE CLAD FIBER/SINGLE MODE FIBER AND METHOD OF ENCAPSULATION".

FIELD OF THE INVENTION

This invention relates, generally, to optical fiber couplings and, more specifically, to optical fiber splices between double clad and single mode optical fibers.

BACKGROUND OF THE INVENTION

In optical fiber applications, and particularly optical fiber telecommunications applications, it is often necessary to couple two optical fibers together by splicing. In some cases, the splice is between a double clad fiber having a pump inner cladding and a single mode fiber. An example is the coupling of the output of a double clad fiber laser to a single mode fiber. Such a system is shown in FIG. 1.

In FIG. 1, a laser diode pump source 14 is coupled to a double clad fiber laser 16. The fiber laser 16 includes a double clad fiber (DCF) 18 fiber that receives pump light in its inner cladding from diode 14. The double clad fiber 18 is coupled to a single mode fiber (SMF) 26, such as a Flexcore™ 1060 fiber. Appropriate fiber Bragg gratings 10 and 12 are provided to form a fiber laser cavity, as shown, with grating 12 being formed in the single mode fiber. The DCF is coupled to the SMF via a splice that, as is typical, is located at the output end of the fiber laser just before the output coupler (ie., the grating 12). The location of the splice in FIG. 1 is identified by broken line box 24. Notably, a similar splice connection would exist if the double clad fiber were part of a fiber amplifier rather than a fiber laser. In such a case, gratings 10, 12 could be omitted, although a grating at the location of grating 10 might be used for stabilizing the pump diode source. Use of such a stabilizing grating is taught in U.S. Pat. Nos. 5,485,481 and 5,715,263, which are incorporated herein by reference.

Generally, it is not practical to make the DCF sufficiently long that all the pump light provided from the pump source is absorbed in the fiber laser. Depending upon the design of the fiber laser, its length, the amount of pump source power provided and the operating wavelength of the fiber laser, several watts of residual pump light may be present in the inner pump cladding of the DCF at the point of the DCF/SMF splice. Due to the difference in the diameter between the DCF and the SMF, a majority of the excess pump light escapes at the splice from the inner cladding. This is shown in FIG. 2, which is a schematic view of splice 24. In another arrangement, the cladding of the SMF may be about the same size as the inner cladding of the DCF, in which case the light from the inner cladding of the DCF would be transmitted through the SMF cladding, and easily coupled into the buffer material.

As shown in FIG. 2, although a portion 20 of the residual pump light in DCF 18 scatters out of the tapered portion of the inner cladding and into the surrounding environment, another portion 22 of the residual pump light is guided along the SMF cladding. Indeed, a significant portion of the residual pump light is coupled into the cladding of the SMF and is guided by the cladding until it reaches buffer 28. Buffer 28 is an outer covering of the SMF, and may comprises, e.g., an acrylate. The buffer may be either an original covering of the SMF, or possibly a covering added following the splicing of the two fibers. Under certain circumstances, the power level of residual light portion 22 can be sufficient to incinerate or burn the buffer and cause the fiber laser to fail catastrophically. Such a failure usually does not occur immediately, but may develop over a period of 15 minutes to several days of continuous operation. Ultimately, of course, failure depends upon the amount of residual pump power 20 being guided into the SMF cladding.

Prior art DCF/SMF splice packages exist that attempt to address the problem of excess residual pump light reaching the SMF cladding, and an example of such a package is shown in FIG. 2A. This package is intended for a DCF/SMF fusion splice, and has scattering means formed on the exposed surface of the cladding of the SMF. This scattering means is in the form of residual pump light scattering centers. In this embodiment, the scattering centers are epoxy beads 30, which have a refractive index higher than the refractive index of the SMF cladding 32. As a result, the light is scattered out of the SMF cladding through the respective light scattering centers. The DCF/SMF fusion splice 34 is housed within housing 36, which may be a glass tube, or a half cylindrical portion of a tube, with the ends of the tube sealed with UV cured epoxy joints 38, which form rigid end portions. This entire structure is covered by an external housing (not shown) that provides protection from the environment and from handling. The external housing may comprise a metal tube of a material such as stainless steel or passivated copper, and the tube covers the plastic buffer end portions 40, 42 of each of the fibers 44, 46, respectively. The ends of the metal tube are sealed with a soft adhesive material such as silicone.

While the foregoing package structure helps to scatter some of the residual pump light, it does not efficiently scatter all the light and dispose of this light in an efficient and securable manner. Also, manufacture of this package structure is time consuming, particularly the placement of the scattering centers.

SUMMARY OF THE INVENTION

In accordance with the present invention, an optical fiber splice apparatus is am provided that supports a splice between two optical fibers, typically dissimilar fibers, while coupling residual pump energy away from the buffer materials of the fibers. After the fibers are spliced together, a covering is provided that surrounds at least an outermost light-guiding portion of a first of the fibers, and preferably surrounds adjoining portions of each of the fibers. The covering is preferably an optical epoxy, and has a refractive index that is higher than the refractive index of an outermost cladding of each fiber. As such, residual pump energy in the fiber cladding is conducted out into the covering material and away from the fiber splice.

In a preferred embodiment, the covering material is surrounded by a glass capillary that is rigid enough to provide rigid support to the splice. The capillary is substantially transparent to the residual pump light so that it may be conducted from the covering to the capillary, and preferably out an end of the capillary. In one embodiment, the capillary is itself surrounded by a rigid housing that provides strong support to all the components inside. Materials for the housing may include stainless steel or passivated copper. The capillary may be secured to the housing by an adhesive epoxy, preferably one that is also substantially transparent to the residual pump light. In this way, pump light in the capillary may be conducted into the adhesive epoxy. In one particular embodiment, a surface of the housing facing the capillary is light absorbent at wavelengths within the wavelength range of the residual pump light such that light passing through the capillary and the adhesive epoxy may be absorbed at the housing surface.

The housing surrounding the splice apparatus of the present invention may be part of an optical gain device, such as a fiber laser or a fiber optic amplifier. The splice may be a coupling between a double-clad fiber of a fiber laser and a single-mode fiber receiving the optical energy output from the laser. As residual pump energy in the double-clad fiber reaches the splice, it exits the fiber cladding into the covering material. It is then coupled into a capillary that surrounds the covering and that is also located within the device housing. Much of the pump light travels through the capillary to its end, where it exits. Some of the pump light is coupled from the capillary to the adhesive material securing the capillary to the housing, which is also transparent to the residual light. This light may also be conducted out the end of the adhesive, or may reach an inner surface of the housing, where it is absorbed.

BRIEF DESCRIPTION OF THE DRAWINGS

The above and further advantages of the invention may be better understood by referring to the following description in conjunction with the accompanying drawings in which.

DETAILED DESCRIPTION

Figure 1:
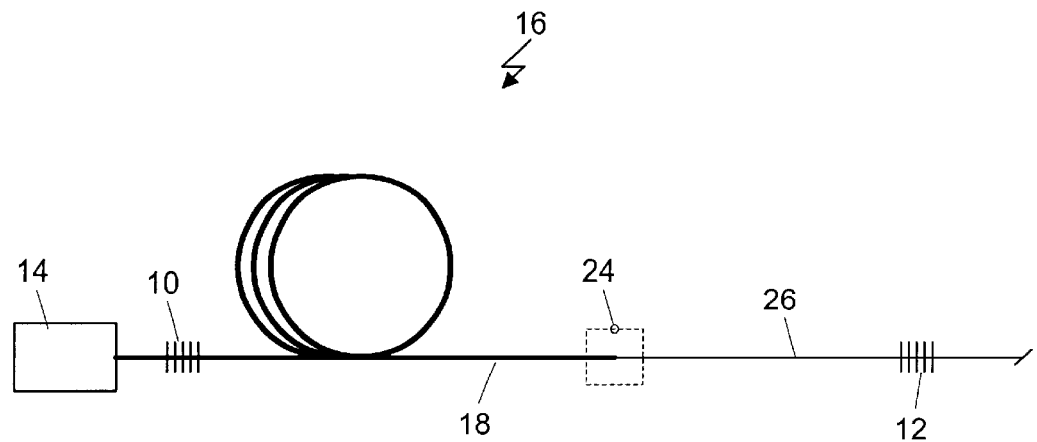
FIG. 1 is a schematic view of a prior art device that has a splice between two dissimilar optical fibers.
Figure 2:
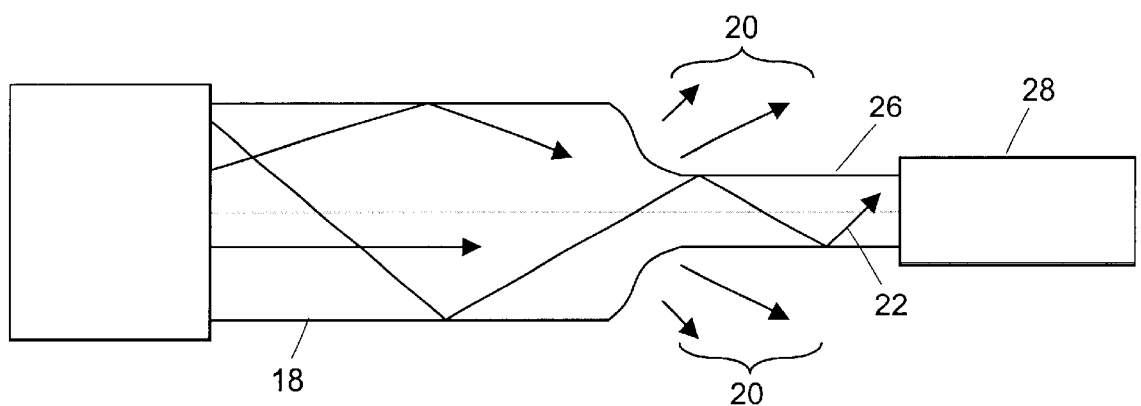
FIG. 2 is a cross sectional side view of a splice typical of the prior art.
Figure 2A:
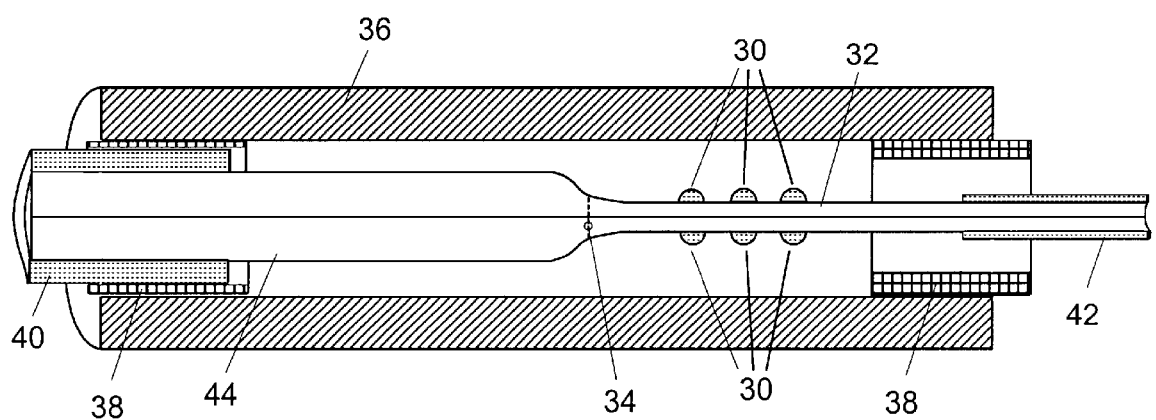
FIG. 2A is cross sectional side view of a prior art fiber splice having light scattering beads along an outer surface of one of the fibers.
Figure 3:
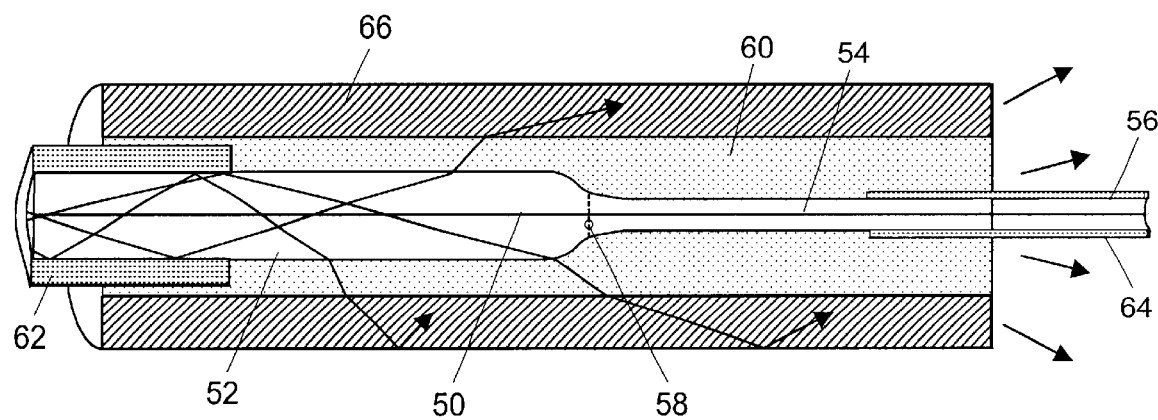
FIG. 3 is a cross sectional side view of a splice apparatus according to the present invention, in which residual pump energy is coupled out of the fiber claddings.

One embodiment of an improved package structure according to present invention is shown in FIG. 3. A core 50 of the double clad fiber 52 is coupled to a core 54 of the single mode fiber 56 at a splice, the location of which is shown by dashed line 58. The structure shown in FIG. 3 differs significantly and importantly from the prior art structure of FIG. 2A in that the splice coupling region is completely surrounded by an optical material 60 that is transparent to residual pump energy. In fact, in the embodiment shown in FIG. 3, the optical material 60 surrounds not only the splice region, but also part of the buffer material 62 of the double clad fiber 52 (which may also serve as the outer cladding of the fiber), and part of the buffer material 64 of the single mode fiber 56. Residual pump light is directed out of the inner (or "pump") cladding of the DCF in the vicinity of the splice 58. This residual energy is dispersed into the optical material bulk, and exits at least one end portion of the package without any significant amount of it encountering the buffer material of the SMF.

In the embodiment shown in FIG. 3, the optical material 60 encapsulating the DCF/SMF splice 58 is an epoxy. Surrounding the epoxy layer is a glass capillary 66 into which light from the optical material may also be coupled. The epoxy is chosen to have a refractive index that is higher than that of the silica fiber claddings of both the DCF and SMF. As such, the residual pump light is ensured to be guided out of the coupled fibers and into the glass capillary 66 before reaching the SMF buffer material 64. Moreover, the residual pump light is spread out into the package bulk, such that its intensity is reduced and, correspondingly, its threat as a heating source to other vulnerable components of the package structure is likewise diminished. With this reduction in light intensity, the light may be safely absorbed by a suitable light dump or light "sink." Of particular importance is the fact that, once the residual pump light expands into the capillary, its intensity is low enough that any heating by the light in a light absorbing material, such as the SMF buffer is minimized. Thus, thermal damage to the buffers is effectively eliminated. In the preferred embodiment, the use of epoxy within a capillary also provides relief from both mechanical and coefficient of thermal expansion (CTE) strain, and gives the splice good overall mechanical stability.

In the preferred embodiment, the encapsulating epoxy has not only a relatively high refractive index, but also high transparency at wavelengths above 900 nm. One example of such a material is Optical Adhesive #61 manufactured by Norland Products Inc., North Brunswick, N.J. This particular epoxy is cured by ultraviolet (UV) light, and has a low viscosity that facilitates the encapsulation process.

While the example in FIG. 3 illustrates an embodiment that comprises high refractive index epoxy within the glass capillary, it will be recognized by those skilled in the art that other materials may also be used. Of particular importance is that the material is a high index material that is substantially transparent to the residual pump light. However, the material need not be an epoxy coating, nor must it fill the entire space between the fibers. A layer formed over the cladding layers of the DCF/SMF splice may be used that does not totally fill the capillary, but that still performs substantially the same function of removing the residual pump light. As long as the material is capable of conducting the light out of the cladding layers, reducing its intensity and directing it to a light sink it will satisfy the requirements of the invention. In this way, the residual light is rendered incapable of causing any damage to low temperature materials used in or associated with the splice packaging, such as the fiber buffers. It is a preferred feature of the present invention to cover or encapsulate not only SMF cladding at the splice but also the DCF cladding along the length of the splice and at the splice joint. This is illustrated in FIG. 3, and allows the residual pump light to be more immediately and uniformly diverted out of the cladding of both fibers. The residual light is thus more quickly spread into the material into which it is ultimately dumped, allowing a more efficient reduction in its overall intensity.

In addition to encapsulating the DCF/SMF splice in a glass capillary, the present invention also provides for further protecting the splice with a metal housing in the shape of a tube. Exemplary materials for such a housing include stainless steel or passivated copper. The DCF/SMF splice can also be mounted directly in a fiber laser package depending upon the particular application, and may be located in a mounting slot shaped, e.g., like a half tube. One manner of mounting comprises securing the splice capillary into a groove formed in the black anodized metal base plate of a fiber laser housing module. The securing may be done, for example, with an epoxy. In one version of this embodiment, an epoxy is used that has a refractive index sufficient to minimize the entry of any stray light from the package into the capillary. In such a case, the epoxy may completely surround the splice capillary, protecting it from stray light while simultaneously securing it to the package.

Figure 4:
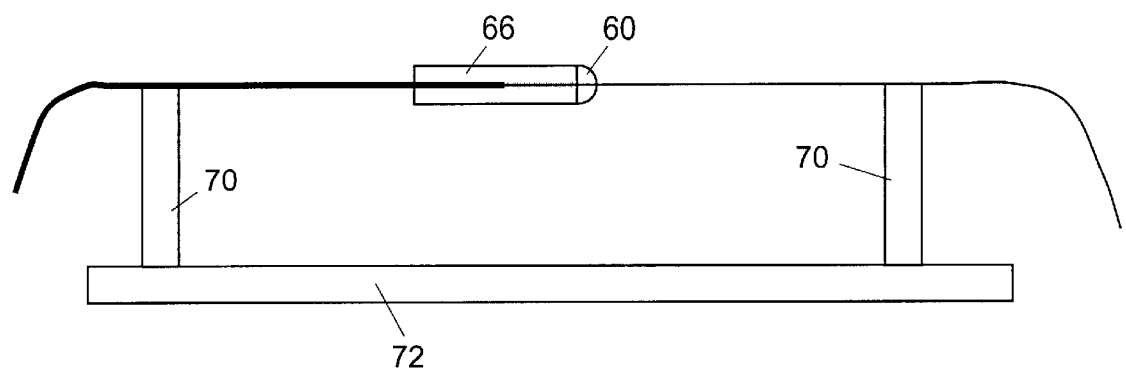
FIG. 4 is a side view of a possible mounting device for use with the fiber splice of the present invention.

A method of encapsulating a splice in accordance with the present invention may be described in conjunction with FIG. 4. In the preferred embodiment of the invention, it is desirable to have the capillary cover approximately 5 mm of the buffer on either side of the splice. The buffer may therefore, for example, be stripped back about 9 mm from the fiber cleave point relative to both fibers. The DCF to SMF splice is then performed as is known in the art. The bare region of the DCF/SMF splice is cleaned with alcohol and the glass capillary 66 is slipped over the fiber splice and centered on the splice. The fiber is then mounted in a set of fixtures 70 that support the fibers to either side of the splice. In the exemplary embodiment, the fiber splice is supported about two or three inches off the surface of table 72. While supported in this position, a drop or so of the high refractive index epoxy 60 is applied to the SMF end of the capillary 66, as shown in the figure, and is allowed to wick through the inside of the capillary 66. Depending on the specific components used, this wicking may take several minutes.

During the wicking process, the end of the tube opposite to that at which the epoxy is applied is left open so that this wicking process is not impeded by air trapped in the capillary. Once the epoxy has filled the entire capillary, it is cured with UV light. The splice is then mounted in the fiber laser package using the adhesive epoxy. In the preferred embodiment, Optical Adhesive #63, by Norland Products, Inc., is used for this purpose. This epoxy has the same wavelength transparency quality and refractive index as the epoxy 60, but has a higher viscosity, making it more suitable for mounting purposes. The mounting of the splice in a laser package is illustrated in FIG. 5 and the cross sectional view of FIG. 5A.

Figure 5:
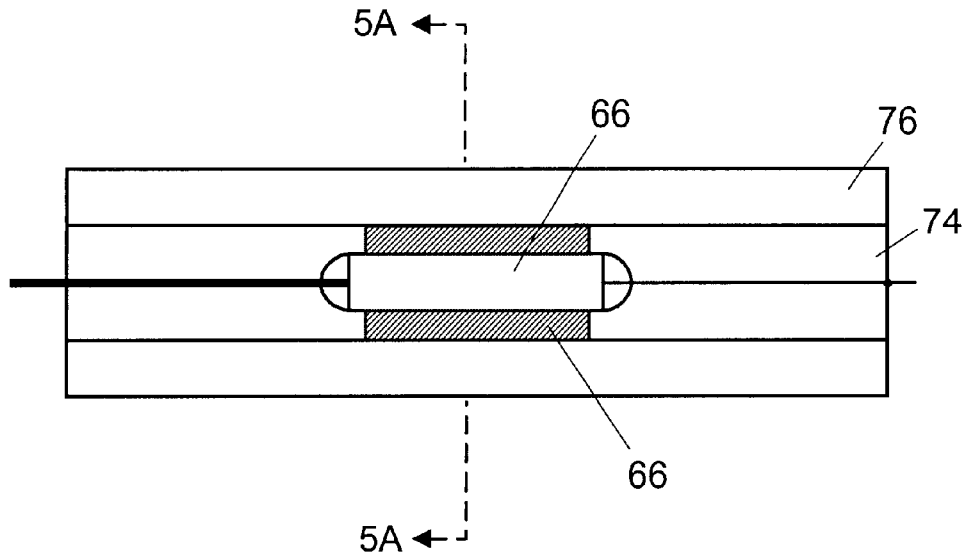
FIG. 5 is a top view of a splice according to the present invention along with a housing within which it is mounted.
Figure 5A:
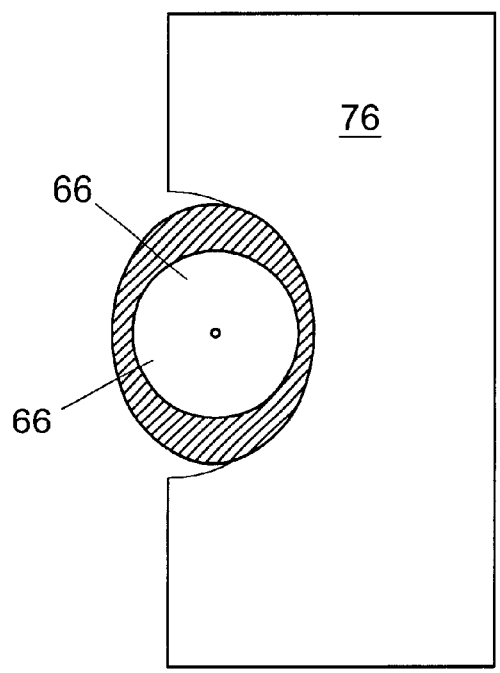
FIG. 5A is a sectional view of the splice and housing shown in FIG. 5.

As shown in FIGS. 5 and 5A, capillary 66 is set in a groove 74 located in metal base plate 76 of the fiber laser housing. An epoxy 78 is directly applied to groove to secure the DCF/SMF splice to the groove. By using an epoxy having the same light transparency characteristics as that epoxy used in the capillary, the residual pump light dispersed in the epoxy sleeve of the splice is coupled out of the capillary through this securing epoxy 78. In the preferred embodiment, the walls of the base plate are black, and absorbing the light coupled into the epoxy layer 78.

While the invention has been shown and described with reference to a preferred embodiment thereof, it will be recognized by those skilled in the art that various changes in form and detail may be made herein without departing from the spirit and scope of the invention as defined by the appended claims.

What is claimed is:

1. An optical fiber splice apparatus for containing a splice between a first optical fiber and a second optical fiber, the apparatus comprising a covering surrounding an outermost light-guiding portion of the first fiber adjacent to the splice, and having a refractive index higher than a refractive index of the outermost light-guiding portion such that residual light in the outermost light-guiding portion is conducted into the covering and away from the fiber splice.

2. An apparatus according to claim 1 wherein the first fiber is a multiple clad fiber and the second fiber is a single-mode fiber.

3. An apparatus according to claim 1 wherein the first fiber is a multiple clad fiber that is part of an optical fiber gain device and the residual light is residual pump light from an the outermost light-guiding portion.

4. An apparatus according to claim 1 wherein the covering comprises an optical epoxy.

5. An apparatus according to claim 1 wherein the covering comprises an epoxy bulk encapsulating the fiber splice.

6. An apparatus according to claim 1 further comprising a capillary within which the epoxy bulk is located.

7. An apparatus according to claim 6 wherein the capillary has a refractive index that allows conduction of the residual light through the epoxy and into the capillary.

8. An apparatus according to claim 7 wherein the capillary is arranged such that the residual light is directed out of an end of the capillary.

9. An apparatus according to claim 6 wherein the capillary is sufficiently rigid to provide rigid support to the fiber splice.

10. An apparatus according to claim 6 further comprising a rigid housing surrounding the capillary.

11. An apparatus according to claim 10 wherein the housing has a surface facing the capillary that is absorbent to wavelengths in a wavelength range of the residual light.

12. An apparatus according to claim 10 wherein the housing comprises metal.

13. An apparatus according to claim 10 wherein the housing is part of a fiber gain device module.

14. An apparatus according to claim 10 further comprising an adhesive epoxy by which the capillary is secured to the housing.

15. An apparatus according to claim 1 wherein the covering surrounds a cladding portion of the second fiber adjacent to the splice.

16. An apparatus according to claim 15 wherein the covering has a refractive index higher than that of the cladding portion of the second fiber.

17. An optical fiber splice apparatus for containing a splice between a first optical fiber and a second optical fiber different from the first optical fiber, the apparatus comprising a covering surrounding adjoining portions of each of the first and second fibers and having a refractive index higher than a refractive index of each of an outermost cladding of the first fiber and an outermost cladding of the second fiber such that residual light in said claddings is conducted into the covering and away from the fiber splice.

18. An optical fiber gain device comprising:
   an optical gain medium including a multiple clad optical fiber;
   a pump source supplying optical pump energy to an inner cladding of the multiple clad fiber;
   a single mode fiber to which the double clad fiber is spliced; and
   a splice covering surrounding adjoining portions of the multiple clad and single mode fibers and having a refractive index higher than a refractive index of an outermost cladding of the multiple clad fiber such that residual pump light in said outermost cladding is conducted into the covering and away from the fiber splice.

19. An optical fiber gain device according to claim 18 wherein the splice covering comprises an optical epoxy.

20. An optical fiber gain device according to claim 18 further comprising a capillary within which the splice covering is located.

21. An optical fiber gain device according to claim 18 further comprising a housing within which the capillary is located.

22. An optical fiber gain device according to claim 18 further comprising an adhesive epoxy that secures the capillary to the housing.

23. An optical fiber gain device according to claim 22 wherein the adhesive epoxy is substantially transparent to the residual light.

24. A method of coupling a first optical fiber to a second optical fiber of a different cross-sectional configuration, the method comprising:

splicing the first fiber to the second fiber;

surrounding an outermost light-guiding portion of the first fiber adjacent to the splice with a covering having a refractive index higher than a refractive index of the outermost light-guiding portion such that residual light in said outermost light-guiding portion is conducted into the covering and away from the fiber splice.

25. A method according to claim 24 further comprising surrounding the covering with a capillary that is substantially transparent to the residual light.

26. A method according to claim 25 wherein the capillary is sufficiently rigid as to provide rigid support the fiber splice.

27. A method according to claim 25 further comprising surrounding the capillary with a rigid housing.

28. A method according to claim 27 wherein the capillary is secured to the housing by an adhesive epoxy.

29. A method according to claim 27 wherein the housing has an surface facing the capillary that is absorbent to wavelengths in a wavelength range of the residual light.

30. A method according to claim 25 wherein the covering is a curable material that is introduced to a space between the fiber splice and the capillary.

31. A method according to claim 30 wherein the covering is introduced to the interior of the capillary through a wicking action.

32. A method according to claim 24 wherein the first fiber is a multiple clad fiber and the second fiber is a single-mode fiber.

33. A method according to claim 24 wherein the covering is an optical epoxy.

34. A method according to claim 24 wherein the covering surrounds a portion of a cladding of the second fiber adjacent to the splice.

35. A method according to claim 34 wherein the covering has a refractive index higher than that of the cladding of the second fiber.

36. A method of coupling a first optical fiber to a second optical fiber of a different cross-sectional configuration, the method comprising:

splicing the first fiber to the second fiber;

surrounding adjoining portions of each of the first and second fibers with a covering having a refractive index higher than a refractive index of each of a cladding of the first fiber and a cladding of the second fiber such that residual light in said claddings is conducted into the covering and away from the fiber splice.

* * * * *